US008090885B2

(12) United States Patent
Callaghan et al.

(10) Patent No.: US 8,090,885 B2
(45) Date of Patent: Jan. 3, 2012

(54) AUTOMATICALLY CONFIGURING COMPUTER DEVICES WHEREIN CUSTOMIZATION PARAMETERS OF THE COMPUTER DEVICES ARE ADJUSTED BASED ON DETECTED REMOVABLE KEY-PAD INPUT DEVICES

(75) Inventors: David Callaghan, Kirkland, WA (US); Daryn E. Robbins, Duvall, WA (US); Sandra E. MacDonald, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 152 days.

(21) Appl. No.: 12/013,569

(22) Filed: Jan. 14, 2008

(65) Prior Publication Data

US 2009/0182901 A1 Jul. 16, 2009

(51) Int. Cl.
*G06F 3/00* (2006.01)
*G06F 13/00* (2006.01)
*H05K 5/00* (2006.01)

(52) U.S. Cl. .................. 710/72; 710/8; 710/10; 710/73; 710/62; 710/12; 710/14; 710/15; 361/730; 704/2; 704/8

(58) Field of Classification Search ................ 710/8–10, 710/62, 63, 67, 72, 260, 261, 65; 341/33; 345/168; 713/1, 2, 100; 704/3, 8, 2
See application file for complete search history.

(56) References Cited

U.S. PATENT DOCUMENTS

| 4,185,282 | A | 1/1980 | Pick ............................... 345/171 |
| 5,914,676 | A | 6/1999 | Akpa .............................. 341/23 |
| 6,621,507 | B1 | 9/2003 | Shah ............................. 715/764 |
| 6,796,496 | B2* | 9/2004 | Andersen et al. ............. 235/380 |
| 6,801,812 | B2* | 10/2004 | Lin et al. .......................... 700/84 |
| 6,927,760 | B2* | 8/2005 | Chin et al. ..................... 345/168 |
| 6,970,109 | B2* | 11/2005 | Wolfson et al. ................. 341/22 |
| 6,996,705 | B2* | 2/2006 | Cheston et al. .................... 713/1 |
| 7,151,529 | B2* | 12/2006 | Hung et al. .................... 345/168 |
| 7,155,544 | B2* | 12/2006 | Im .................................. 710/67 |
| 7,277,732 | B2 | 10/2007 | Chen et al. ..................... 455/566 |
| 7,432,911 | B2* | 10/2008 | Skarine ......................... 345/168 |
| 7,528,861 | B2* | 5/2009 | Kumagai et al. ............ 348/207.1 |
| 7,531,986 | B2* | 5/2009 | Eager et al. .................... 320/116 |
| 7,755,905 | B2* | 7/2010 | Kohnke .......................... 361/730 |
| 2002/0116172 | A1* | 8/2002 | Vargas .............................. 704/8 |
| 2004/0230912 | A1 | 11/2004 | Clow et al. .................... 715/773 |
| 2005/0036293 | A1* | 2/2005 | Kohnke ......................... 361/730 |

(Continued)

FOREIGN PATENT DOCUMENTS

JP 11327725 * 11/1999

(Continued)

OTHER PUBLICATIONS

Multi-Language Input on Your Smartphone, Courtesy of Paragon! http://www.mtekk.com.au/Articles/tabid/54/articleType/ArticleView/articleId/429/Default.aspx.

(Continued)

*Primary Examiner* — Tammara Peyton
(74) *Attorney, Agent, or Firm* — Merchant & Gould P.C.

(57) ABSTRACT

Localization and/or customization of computing devices are accomplished automatically through an add-on input device. Operating system or a separate application in the computing device is arranged to communicate with or recognize the input device such as a keypad and configure parameter of the computing device such as language, user interface arrangement, communication setup, and the like accordingly without user interaction.

20 Claims, 5 Drawing Sheets

U.S. PATENT DOCUMENTS

| | | |
|---|---|---|
| 2005/0195171 A1 | 9/2005 | Aoki .......................... 345/172 |
| 2005/0278461 A1 | 12/2005 | Ohta |
| 2006/0047498 A1 | 3/2006 | Fux et al. ........................ 705/3 |
| 2007/0008288 A1 | 1/2007 | Yu et al. ...................... 168/168 |
| 2007/0015538 A1* | 1/2007 | Wang ............................ 455/558 |
| 2007/0226805 A1* | 9/2007 | Jeal et al. ....................... 726/27 |
| 2007/0229463 A1 | 10/2007 | Tsukamoto .................. 345/172 |
| 2008/0266145 A1* | 10/2008 | Verma et al. ................... 341/23 |
| 2008/0270114 A1* | 10/2008 | Song ................................ 704/8 |
| 2009/0089042 A1* | 4/2009 | Wald et al. ....................... 704/2 |

FOREIGN PATENT DOCUMENTS

| | | |
|---|---|---|
| JP | 2006-338471 A | 12/2006 |
| KR | 10-2005-0068693 A | 7/2005 |
| KR | 10-2006-0038576 A | 5/2007 |

OTHER PUBLICATIONS

Multiple Input Language Support, http://msdn2.microsoft.com/en-us/library/ms904378.aspx.

Multiple-Language Support http://publib.boulder.ibm.com/infocenter/pcomhelp/v5r9/index.jsp?topic=/com.ibm.pcomm.doc/books/html/admin_guide24.htm.

Guide to Windows Vista Multilingual User Interface http://technet2.microsoft.com/WindowsVista/en/library/85e289ca-9fd8-4963-b06a-5ecc457006c71033.mspx?mfr=true.

* cited by examiner

AUTOMATICALLY CONFIGURING COMPUTER DEVICES WHEREIN CUSTOMIZATION PARAMETERS OF THE COMPUTER DEVICES ARE ADJUSTED BASED ON DETECTED REMOVABLE KEY-PAD INPUT DEVICES

BACKGROUND

Ever increasing functionality and decreasing cost of digital technology has resulted in proliferation of computing devices, especially mobile computing devices in numerous aspects of daily life. It is quite common for people to own multiple computing devices and use them for various purposes in different locations. People travel with their Personal Digital Assistants (PDAs), laptop computers, smart phones, etc., locally or internationally. Most computing devices include some form of an input device such as a hard keyboard (or keypad), a soft keyboard (through a user interface on a touch sensitive display), and the like, for data entry and manipulation.

While some aspects of computing devices may need to be localized or custom configured based on user's needs, many components are common and do not require custom manufacture. Therefore, it is a common practice for manufacturers of such devices to fabricate a base device and have affiliates or subsidiaries localize and/or configure the base device according to the needs of particular user groups such as computing devices localized in particular countries with their own regulatory, language, and other requirements or for a specific group of users such as Braille-equipped devices for sight-impaired people.

In many cases, such localization/customization involves replacement (or placement) of particular input devices, configuration of software and/or hardware components such as display, user interface, and so on. This results in increased costs to not only to the end user, but also to the manufacturer since computing devices have to be designed with these customizations in mind, components that could be integrated for cost and design efficiency may not be integrated, etc. Moreover, the manufacturer loses control over particular aspects of the device and has to find partners for performing the customization or invest itself in the customization process.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to enabling computing devices to be configured for particular local or user requirements through the selection of an input device. Operating system and/or other major components of a computing device according to embodiments are arranged such that upon connection with an input device, such as a plug-in keypad, they can be configured for local and/or user requirements automatically.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, a computing device can be configured for local and/or user requirements automatically through an add-on input device. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process.

Figure 1:
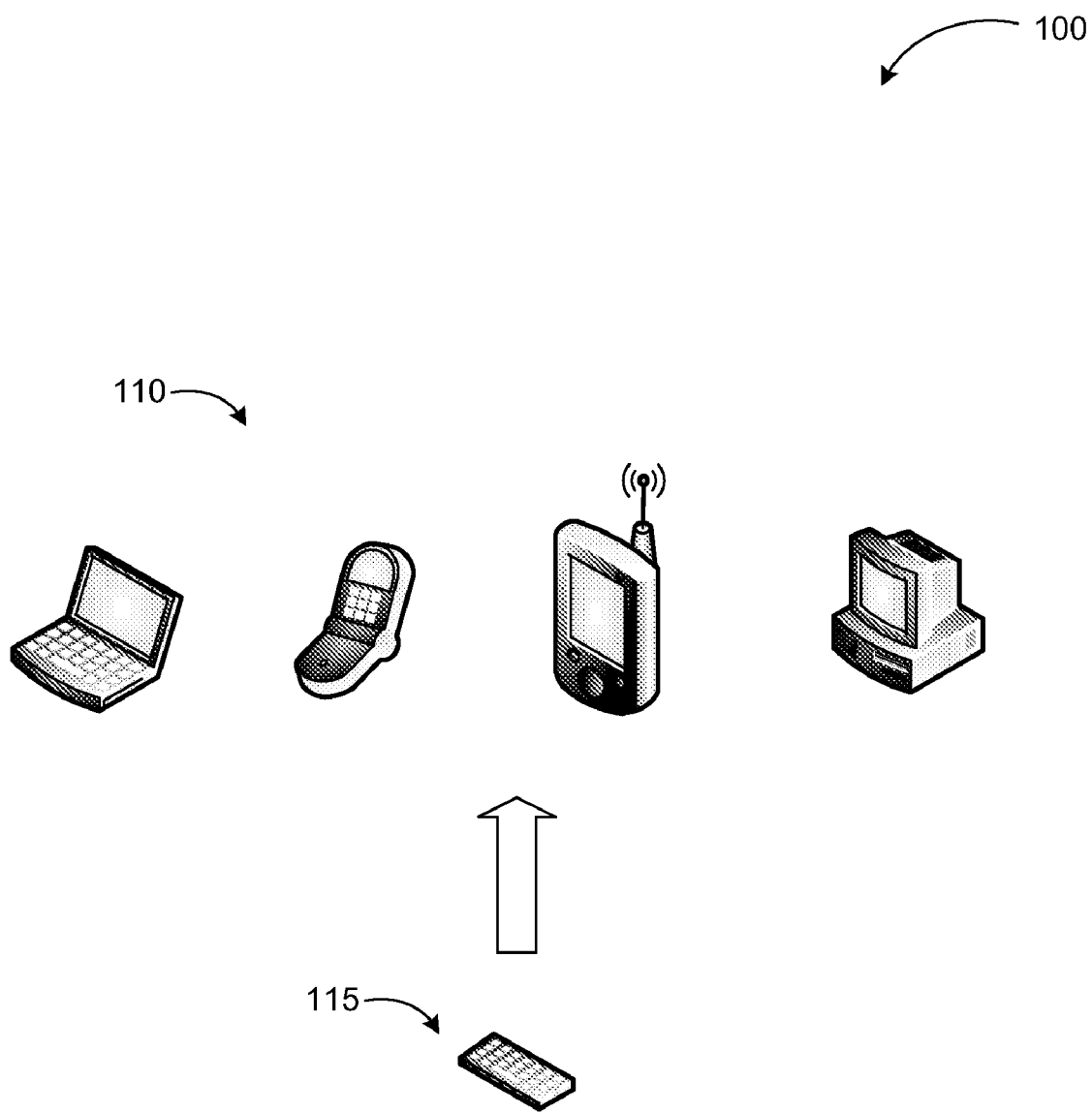
FIG. 1 is a conceptual diagram illustrating that various computing devices can be configured automatically through an add-on input device (e.g. a keyboard)

Referring to FIG. 1, a conceptual diagram of how various computing devices can be configured automatically through an add-on input device (e.g. a keyboard) is illustrated in diagram 100. While some examples of computing devices and their customization is discussed in FIG. 1, the basic concepts of customizing a computing device automatically through an input device can be implemented in many other computing devices using various types of input devices.

Portable computing devices such as PDAs, smart phones, or even notebook PCs are widely available and used by people in many countries. One of the challenges to manufacturers of such devices is customization of device characteristics such as user interface language; formatting for date, time, currency, etc.; special accommodation features for disabled; and so on. With many such devices being equipped with wired or wireless communication capabilities, configuring the device for compliance with local regulatory requirements and/or availability of communication services is also part of the challenge of computing device customization.

One aspect of customization is linked with a (mostly) hardware component of a computing device, the keyboard or keypad. Language customization typically requires the use of a custom keyboard or keypad specially designed for a particular language. Conventional solutions for keypad—language dilemma include manufacturing of different versions of the computing device for distinct user languages, removable keypads sold separately, or removable "skins" that can be applied by the user to the existing keypad in combination with user configuration of the software in the computing device. As discussed above, all of these solutions have their disadvantages. For the manufacturer design, manufacture, inventory, and service of multiple versions, even if the keypad is removable becomes a cumbersome undertaking. The increased cost associated with having to handle multiple versions and configurations is inadvertently passed on to the users. In addition, configurations that require user interaction are not the optimal solution and a major cause of service calls.

On the other hand, processing power and computing capabilities of today's devices have reached such a level where the operating system or an application executed by the operating system can easily handle customization tasks if the system is componentized and provided the appropriate input for configuring itself. A computing device according to embodiments such as one of the laptop computer, smart phone, handheld computer, a smart automobile console, or even desktop computer (110) is enabled to be customized automatically through the connection of an input device (e.g. keyboard) 115. It should be noted that a computing device may interconnect with a plurality of input devices through a single or multiple ports.

Input devices for computing devices vary in type too. Commonly used ones include different types and forms of keyboards (e.g. full-size QWERTY keyboard, limited size keyboards, numeric keyboards, etc.), smaller size keypads (also ranging from QWERY style to small keypads with a few keys), combination devices (a keypad with a touch-sensitive pad), and so on. While most keyboards/keypads have physical keys, there are also keyboard style input devices with virtual keys such as those generated by laser beam reflection on a surface. Embodiments are not limited to the input devices discussed here and may be implemented with any type of suitable input device using the principles described herein. Furthermore, computing devices according to embodiments are not limited to the examples given in this specification. Any computing device in need of customization with some form of add-on input device may implement the present disclosure. For example, digital recording and playback devices (cameras, music players, etc.) are evolving to include more and more features. Embodiments may be implemented in a digital recording device with a removable keypad, where the language and other features of the recording device (e.g. sound or video standards) may be configured according to the input device connected to the digital recording device.

Figure 2:
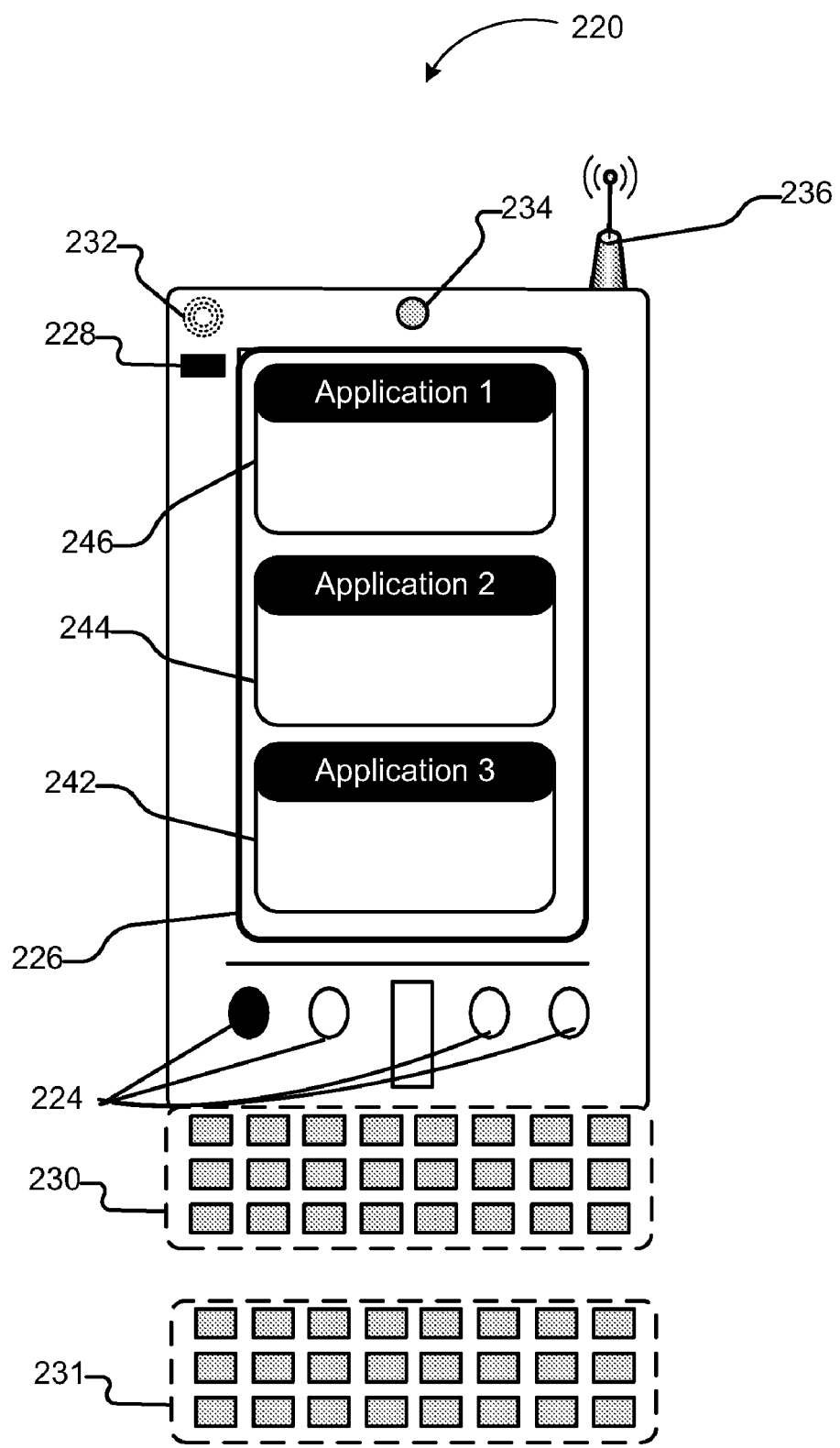
FIG. 2 illustrates an example mobile computing device with a plug-in keypad according to one embodiment.

FIG. 2 illustrates an example mobile computing device with a plug-in keypad according to one embodiment. According to a preferred embodiment, a mobile computing device with a removable keypad may be arranged such that the mobile device can be localized based on a keypad attached to the device.

Mobile device 2420 is shown with many features. However, embodiments may be implemented with fewer or additional components. Example mobile device 220 includes typical components of a mobile computing device such as a removable keypad 230, an optional remote keypad 231, specialized buttons ("function keys") 224, display 226, and one or more indicators (e.g. LED) 228. Mobile device 220 may also include a camera 234 for video communications and microphone 232 for voice communications. The keypads 230 and 231 may be physically connected to the mobile device 220, or cooperatively coupled through wireless networks such as Bluetooth (IEEE 802.15), Zigbee (IEEE 802.15.4), or IR (infrared). Optional antenna 236 may be utilized for wireless communication with one or more networks. There may be one or more antenna components 236 used to send or receive electromagnetic signals include those specific to telecommunications, as well as global positioning signals. The device may also include multiple antennas (one for each type of network). Display 226 may be an interactive display (e.g. touch sensitive) and provide soft keys as well.

Mobile device 220 is capable of executing a variety of applications such as application 1 (246), application 2 (244), and application 3 (242) for different purposes. These applications may range from communication applications to word processing applications, from data analysis applications (e.g. stock trend analysis) to spreadsheet applications, internet web browsers, voice recognition software, global positioning software, and so on. Most such applications require or accommodate some form of localization such as language selection, data presentation format, communication format, and the like. The applications are executed within an operating system of the mobile device 220. The physically connected keypad 230 or remote keypad 231 may be associated with one application 242, or multiple applications 242 and 244 and 246 on the mobile device 220. The applications may be configured to receive input exclusively or have an input affinity for one or more of the keypad devices 230 and/or 231. The operating system itself may require or accommodate customization as described above. Some or all of the customization may be integrated. For example, upon selection of a user interface language, data presentation format and communication parameters associated with that language may be configured as well. On the other hand, some customization parameters may be associated with more than one language or vice versa. In that case, different localization parameters may be set separately (e.g. communication parameters and date & time formats may be set differently for user in the UK, US, and Australia although the language is English for all three countries). In addition, input from a particular language keypad 230 or 231 may impact the behavior of an instance of a standard application such as a web browser. For example, using the Italian keypad instead of an English one may result in the browser selecting a web search engine associated with the keypad language instead. In addition a voice recognition software vocabulary may look for additional language keywords when the additional keypads are cooperatively coupled. The device may additionally modify web site home page settings for example to include sites with advertisements or special offerings of interest to persons with related language capabilities.

The operating system or an application controlled by the operating system of mobile device 220 is componentized to handle multiple customizations according to embodiments. Thus, mobile device 220 may be manufactured and shipped to retail users with a default configuration (including or without a corresponding keypad). Compatible keypads for the device are configured such that their configuration can be detected by the mobile device upon connection. So, when the end user connects (or cooperatively couples) a particular keypad (or replaces the default keypad with another one, mobile device detects the new keypad, determines customization parameters associated with the new keypad, and configures itself automatically.

The customization parameters may include the example ones described above, but are not limited to those. According to some embodiments, additional device configuration may be achieved based on the connected keypad (input device). For example, various capabilities of the device may be turned on or off based on the connected keypad. A handheld computing device with multiple communication capabilities may be shipped with a default keypad and no communication capability turned on. The users may purchase compatible keypads from communication service providers (e.g. cellular communication service providers). When the user plugs in the purchased keypad, the handheld device may activate the communication capability associated with that keypad enabling the user to use the device for communication over the particular service provider's network.

According to some embodiments, the input device (e.g. keypad) may transmit its identity and the computing device may determine the customization parameters based on the keypad's identity. According to other embodiments, the keypad may transmit one or more of the customization parameters directly to the computing device. As mentioned above, a computing device may interconnect with multiple input devices. Thus, a computing device may be configured to accommodate multiple identities, each customized according to one of the connected input devices. For example, one English keyboard and one German keyboard may be connected to the same computer, which may be set up with two user accounts, each customized for English and German user interfaces based on detection of the respective keyboards. Alternatively, the computer may support multiple virtual desktops which are associated with input from the respective English or German keyboard.

User interface language support is one parameter envisioned to be a common use platform for embodiments. Language configuration is not limited to spoken human languages, however. Other forms of language customization such as Braille mapping of user input, customization of keys for particular purposes (e.g. assigning statistical analysis functions to particular keys), or even customization of the keys for certain dialects (Mandarin vs. simplified Chinese) or other tactile input preferences may also be accomplished through detection the keypad.

The operating system can be aware of the keypad currently in place and automatically switch input mappings of the physical keying through several mechanisms. The keypad may include keying or index pins, which automatically select the appropriate language input mechanism. According to other embodiments, a magnetic or electrical detection mechanism such as optical communication, Hall-effect sensors, barcode scanning, RFID tag communication, Bluetooth communication, or other network means may be utilized to automatically switch the operating system configuration. According to one embodiment, the system may also be configurable to operate multiple interfaces (e.g. multiple languages) at the same time.

Keypad 230 represents a wide range of input devices that may be used to configure the mobile device as discussed previously. Keypads or keyboards are only one category of such input devices. The keypads according to some embodiments may be active or passive. Active keypads may include the capability to transmit their identification or additional information to the mobile device through one of the means listed above. These keyboards may transmit actual Unicode keypad inputs to the operating system. Passive keypads may include, but are not limited to, cover plates, templates, slip on covers, clip-on covers, indexing templates, skins, and the like. These keypads may also be equipped with a mechanism to identify themselves to the mobile device such as an RFID tag, a barcode, a Bluetooth module, and the like.

Further extensions to the generic input mechanism represented by keypad 231 may include an input mechanism determining a voltage used to re-charge or power the device. This input information may detect, for example, 110 or 220 Volts input to the system during an initial configuration mode and result in a default configuration of USA English or UK English respectively. Additionally one of the applications executed by the device (e.g. application 242) in conjunction with antenna 236 may be used to receive and process GPS (global positioning information) and thereby determine the default language, input, and configuration parameters. A mobile device 220 powered up in New York may operate by default in USA English configuration and adjust its input mechanisms and application behavior particular to that locale vs. a device powered up in Madrid, Spain may configure Spanish language and localized software and hardware input preferences and configuration for Spanish.

Figure 3:
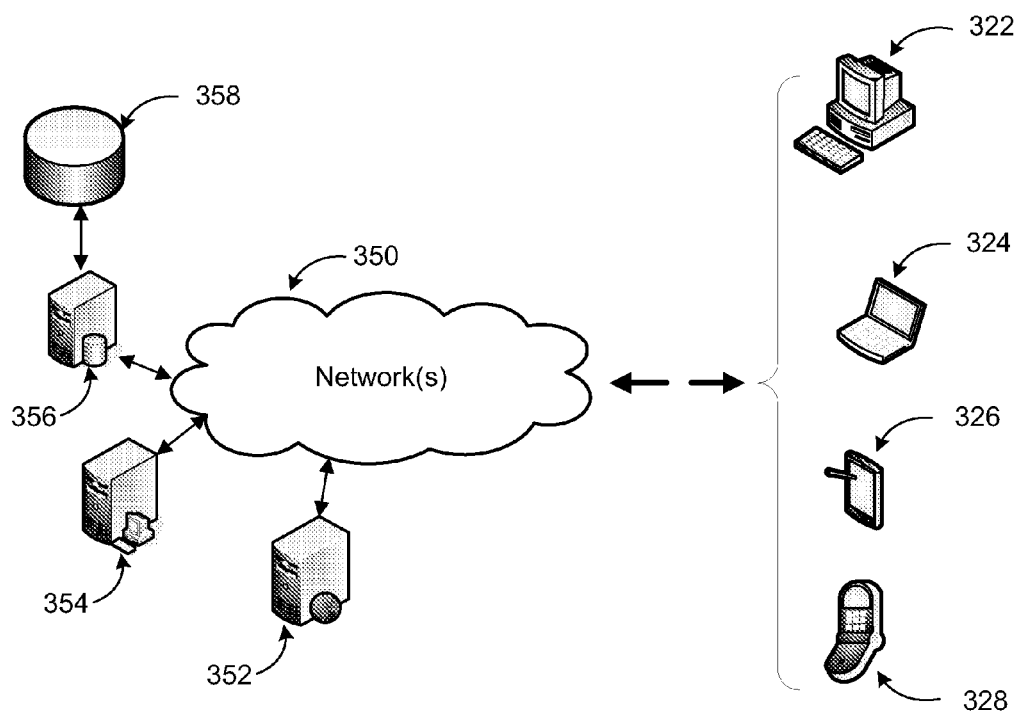
FIG. 3 is an example networked environment, where devices according to embodiments may be used.

FIG. 3 is an example networked environment, where devices according to embodiments may be used. As discussed above, computing devices 322-328 may be capable of facilitating communications through one or more networks (e.g. network 350). Some of these networks may co-exist in the same location (e.g. a cellular network and a WLAN). Furthermore, communication parameters for the networks may differ depending on which network is desired for communication or a location of the user (e.g. regulatory requirements in different countries). The communication parameters and others may be automatically configured along with language interface by connecting a particular input device to the computing device.

According to one embodiment, the configuration information associated with different customizations may be stored in the computing device and used by the operating system or an assigned application to configure the device upon detection of the input device. According to another embodiment, the configuration information may be provided by a server associated with network 350. For example, custom configuration information for a particular type of computing device may be stored in data store 358 which may be managed by the device manufacturer or an affiliate. Data store 358 may be accessible directly or through database server 356. Server 354 or 352 may execute a program for activation, configuration, and tracking of end users' computing devices. In this scenario, the end user may plug in their new input device (e.g. a custom keyboard) to their computing device, which upon connection to the network reports the new keyboard to the server. The server then provides customization parameters to the computing device and maintains a record of the computing device's configuration for service, market analysis, and similar purposes. It should be appreciated that the subject invention includes leveraging the device input language configuration to associate targeting advertising or applications relevant with the device language settings. For example, a device with input capability for Spanish and English may receive SMS messages localized to the language as a result of the network 350 detecting the device 322-328 configuration.

A networked system for customizing computing devices automatically based on input device(s) may also be implemented in un-clustered systems or clustered systems employing a number of nodes communicating over one or more networks. Such a system may comprise any topology of servers, clients, Internet service providers, and communication media. Also, the system may have a static or dynamic topology. Network(s) 350 may include a secure network such as an enterprise network or a cellular network, an unsecure network such as a wireless open network, or the Internet. Network(s) 350 provide communication between the nodes described herein. By way of example, and not limitation, network(s) 350 may include wired media such as a wired network or direct-wired connection, and wireless media such as acoustic, RF, infrared and other wireless media.

Many other configurations of computing devices, applications, data sources, data distribution systems may be employed to implement a system according to embodiments. Furthermore, the networked environments discussed in FIG. 3 are for illustration purposes only. Embodiments are not limited to the example applications, modules, or processes.

Figure 4:
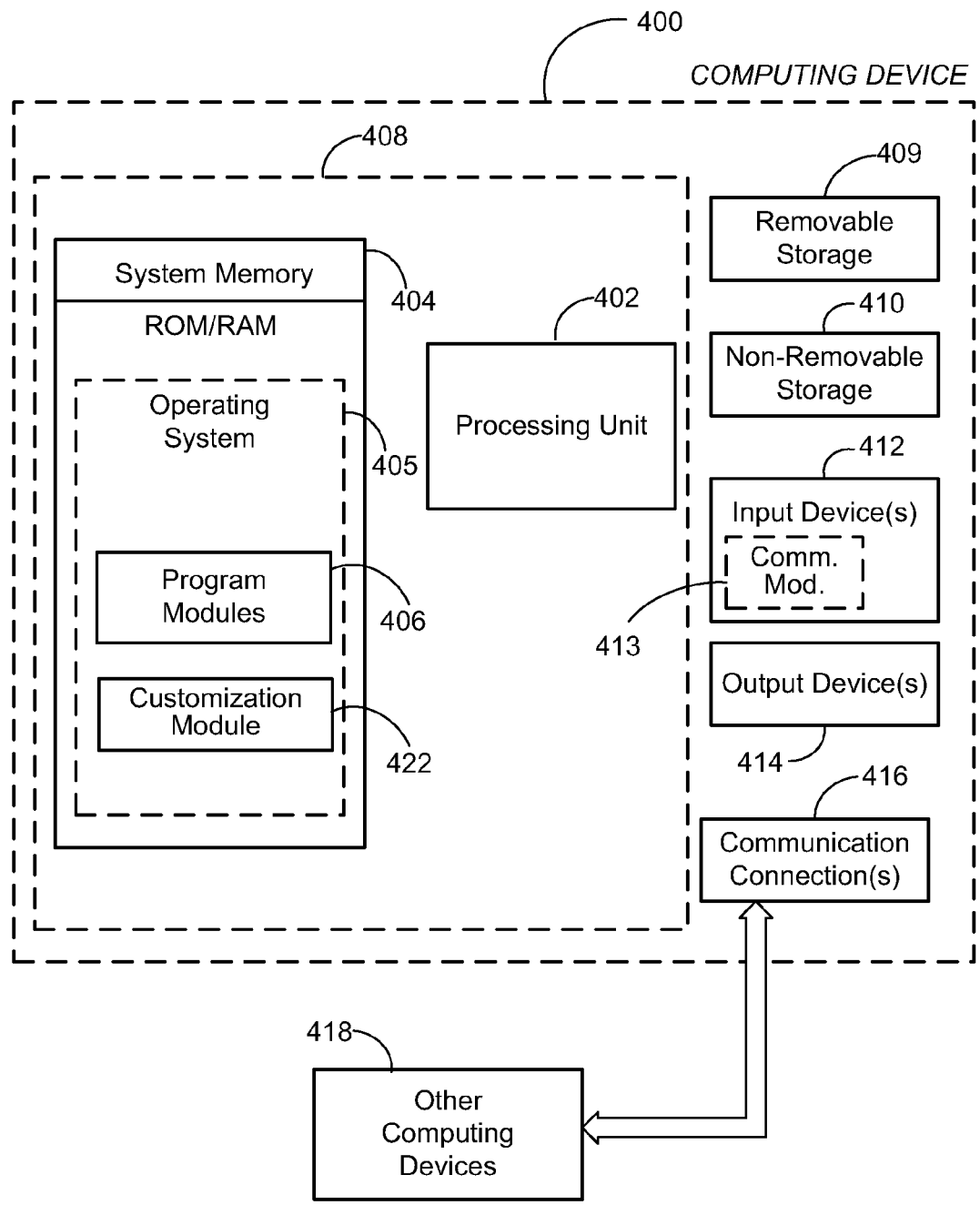
FIG. 4 is a block diagram of an example computing operating environment, where embodiments may be implemented.

FIG. 4 and the associated discussion are intended to provide a brief, general description of a suitable computing environment in which embodiments may be implemented. With reference to FIG. 4, a block diagram of an example computing operating environment is illustrated, such as computing device 400. In a basic configuration, the computing device 400 may be any computing device with a replaceable input device (e.g. keyboard or keypad) and typically include at least one processing unit 402 and system memory 404. Computing device 400 may also include a plurality of processing units that cooperate in executing programs. Depending on the exact configuration and type of computing device, the system memory 404 may be volatile (such as RAM), non-volatile (such as ROM, flash memory, etc.) or some combination of the two. System memory 404 typically includes an operating system 405 suitable for controlling the operation of a networked personal computer, such as the WINDOWS®, Windows CE®, and Windows Mobile® operating systems from MICROSOFT CORPORATION of Redmond, Wash. The system memory 404 may also include one or more software applications such as program modules 406 and customization module 422.

As discussed above, customization of the computing device based on a connected input device may be accomplished by detection of the input device, determination of customization parameters associated with the detected input device, and application of those parameters to the computing device. These tasks may be executed by the operating system 405 directly, through customization module 422, or through a separate application (not shown). This basic configuration is illustrated in FIG. 4 by those components within dashed line 408.

The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by removable storage 409 and non-removable storage 410. Computer storage media may include volatile and non-volatile, removable and non-removable media implemented in any method or technology for storage of information, such as computer readable instructions, data structures, program modules, or other data. System memory 404, removable storage 409 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of device 400. Computing device 400 may also have input device(s) 412 such as keyboard, mouse, pen, voice input device, touch input device, etc. Output device(s) 414 such as a display, speakers, printer, etc. may also be included. Many of these devices are well known in the art and need not be discussed at length here.

However, input device 412 according to embodiments is capable of providing at least its identification, or additional information to the computing device. For that purpose, input device 412 may include a communication module 413 (e.g. an RFID tag, a short range wireless communication module, etc.). Input device 412 may provide its identity or at least some of the customization parameters to the computing device 400 through index pins, keying, or other mechanisms as well.

The computing device 400 may also contain communication connections 416 that allow the device to communicate with other computing devices 418, such as over a wireless network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 5:
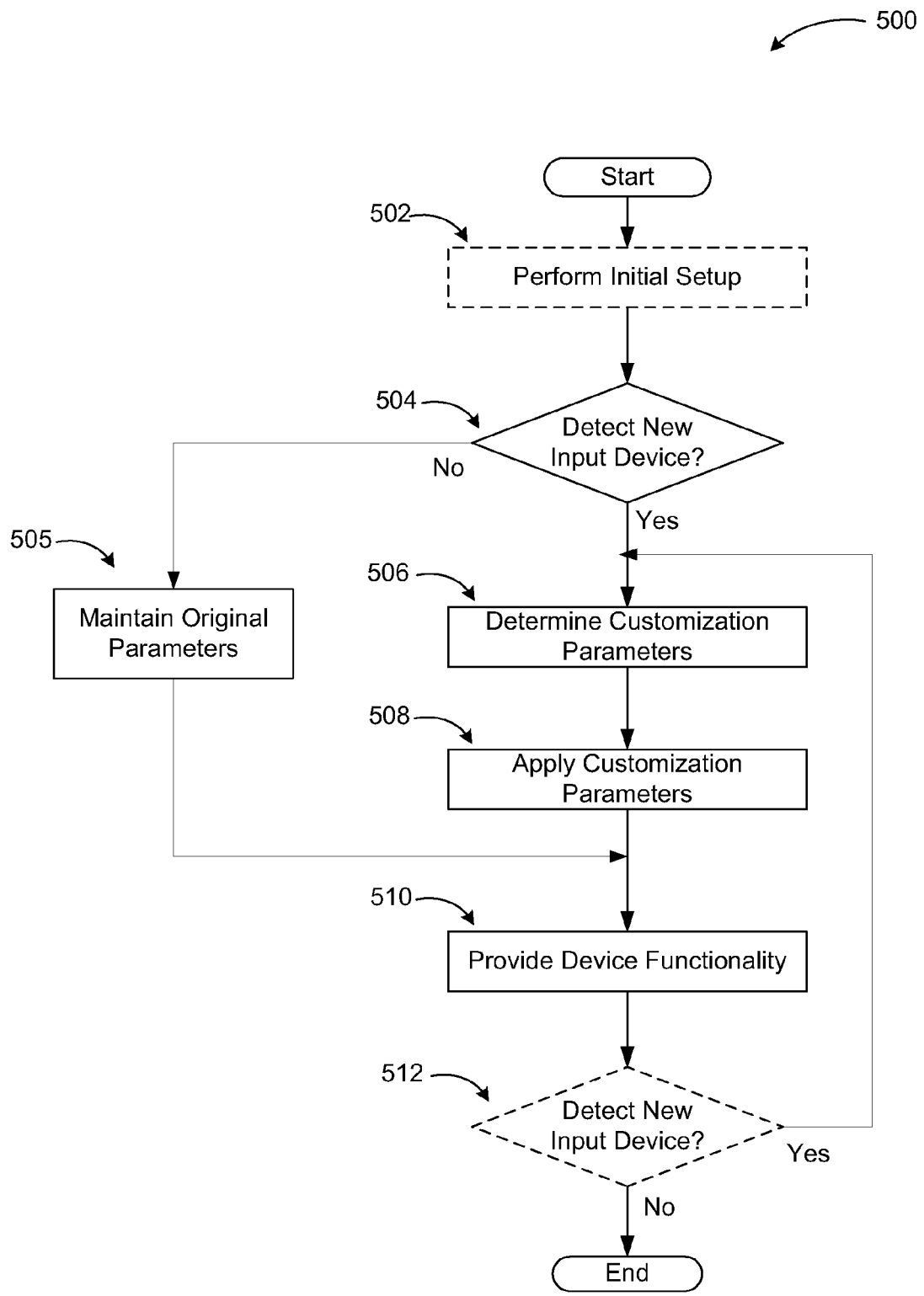
FIG. 5 illustrates a logic flow diagram for a process of automatically configuring a computing device through an input device.

FIG. 5 illustrates a logic flow diagram for process 500 of automatically configuring a computing device through an input device. Process 500 may be implemented in any computing device with a removable input device or inputs associated with determining language.

Process 500 begins with optional operation 502, where an initial setup is performed for the computing device. The initial setup may include some or no user involvement. During the initial setup, default parameters for language, date and time format, and other localizable attributes may be configured standalone or with information from input devices or location information detected or received by the device. Processing advances from optional operation 502 to decision operation 504.

At decision operation 504, a determination is made whether a new input device is detected. The detection may include cooperatively coupling new language specific input devices as well as requests from remote servers or determination of local influencing inputs such as messages from mobile operator network as well as GPS (global positioning satellite) signals. If no new input device/request is detected, the device and its applications continue operating with the default parameters as shown in operation 505. If a new input device is detected, processing moves to operation 506.

At operation 506, customization parameters, examples of which such as user interface language have been listed previously, are determined based on the detected input device as described in detail previously. Processing moves from operation 506 to operation 508.

At operation 508, the determined customization parameters are applied to appropriate components of the computing device. As discussed previously, more than one customization may also be configured (e.g. multiple languages). Processing advances from operation 508 to operation 510.

At operation 510, various device functions are performed using the customized parameters. For example, date and time may be provided in the selected format, communication may be enabled based on selected locale, and more importantly user interface language may be set to one associated with the detected input device. Processing advances from operation 510 to optional decision operation 512.

According to some embodiments, a computing device may continually monitor the connected input device(s) and go through operations 506-510 if a new input device is detected at any point in its life. This way, users may switch between different custom configurations, languages, communication services, and the like, by simply changing the input device. According to other embodiments, multiple input devices may be connected at the same time allowing the computing device to accommodate multiple customized user accounts based on each input device.

The operations included in process 500 are for illustration purposes. Automatically configuring a computing device based on a connected input device may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device having a computer-readable storage medium having instructions stored within, for customizing computing device functionality based on a connected input device, the method comprising:

in the computing device, detecting the connected input device;

customizing the computing device automatically, upon detecting a plurality of connected input devices, at least two of the input devices being keyboards, the customizing of the computing device comprising determining customization parameters based on the connected input devices, one customization parameter specifying a first user interface language for a first keyboard of the at least two input devices, a second customization parameter specifying a second user interface language for a second keyboard of the at least two input device, the first user interface language being different from the second user interface language, the first keyboard customized for the first user interface language and the second keyboard customized for the second user interface language being both connected to the computing device, the first user interface language including the capability of supporting a customization for a Braille mapping of a first user input to the first keyboard, a customization for a Mandarin dialect and a customization for an assignment of one or more statistical analysis functions to one more keys of the first keyboard, the second user interface language including the capability of supporting a customization for a Braille mapping of a second user input to the second keyboard, a customization for a Mandarin dialect and a customization for an assignment of one or more statistical analysis functions to one more keys of the second keyboard, a third customization parameter specifying a communication customization, the communication customization providing a communication capability for the computing device over a service provider network, and a fourth customization parameter specifying a currency;

automatically customizing a configuration of the computing device functionality based on the determined customization parameters, the computing device being customized for the user interface language, the communication capability and the currency automatically upon the detection of the connected input device;

providing the computing device functionality based on the custom configuration; and automatically adjusting one or more of the customization parameters of the computing device based on location information, one of the customization parameters being adjusted by the location information being the user interface language.

2. The method of claim 1, wherein the device functionality includes at least one from a set of: date and time format, assignment of special functions to select keys, implementation of communication parameters, and accommodation of disability assistance features.

3. The method of claim 1, wherein the input devices include at least one of: a keypad, an enhanced keypad with touch-sensitive pad, and an enhanced keypad with a wheel-mouse.

4. The method of claim 1, further comprising:

providing the computing device to an end user with a default configuration; and customizing a current configuration anytime a new input device is connected to the computing device.

5. The method of claim 4, wherein the computing device with the default configuration includes a default input device.

6. The method of claim 1, wherein detecting the connected input devices includes determining an identity of the connected input devices by one of active communication and passive communication with the connected input devices.

7. The method of claim 6, wherein the active communication includes at least one from a set of: short range wireless communication, wired communication, optical communication, and communication with a Radio Frequency Identification (RFID) tag on a connected keyboard.

8. The method of claim 6, wherein the passive communication includes at least one from a set of: scanning a symbol on a connected input device, keying on the connected input device, one or more index pins on the connected input device, and a key stroke combination from the connected input device.

9. The method of claim 1, wherein detecting a connected input device includes determining an identity of one from a set of: a skin, a cover, a cover plate, a slip-on cover, a clip-on cover, a template, and an indexing template attached to a default input device integrated to the computing device through passive communication.

10. The method of claim 1, wherein the customization parameters are retrieved from one of: a storage within the computing device, a server connected to the computing device through a network, and a connected input device.

11. The method of claim 1, wherein the computing device includes one of: a laptop computer, a desktop computer, a Personal Digital Assistant (PDA), a handheld computer, a smart phone, a smart auto console, and a digital recording device with a removable keypad.

12. A mobile computing device with a removable keypad and a default configuration, comprising:
 a memory;
 a data store;
 a processor coupled to the memory and the data store, wherein the processor is configured to execute program instructions for:
  detecting an identity of a newly connected removable keypad, the removable keypad including keying or index pins which transmit the identity of the keyboard to the processor;
  automatically retrieving customization parameters based on the detected identity, one of the retrieved customization parameters specifying a user interface language, one of the retrieved customization parameters specifying a currency and another of the other retrieved customization parameters specifying a communication customization, the customization parameter specifying the user interface language including the capability of supporting a customization for a Braille mapping of a user input to the removable keypad, a customization for a Mandarin dialect and a customization for an assignment of one or more statistical analysis functions to one more keys of the removable keypad, the communication customization providing a communication capability for the mobile computing device over a service provider network;
  automatically customizing the configuration of the computing device based on the retrieved customization parameters;
  providing computing device functionality based on the custom configuration;
  repeating the customization anytime one of: a new removable keypad and new removable keypad accessory is detected; and
  automatically adjusting two or more of the customization parameters of the computing device based on location information, one of the customization parameters being adjusted by the location information being the user interface language and another of the customization parameters being adjusted by the location information being the currency.

13. The system of claim 12, wherein the configuration is customized by one of: an operating system of the computing device and an application controlled by the operating system of the computing device.

14. The system of claim 12, wherein at least a portion of the remaining customization parameters are linked with the user interface language.

15. The system of claim 12, wherein the mobile computing device is capable of communication through a plurality of communication modes, and wherein the customization of the configuration includes activation of at least one of the plurality of communication modes.

16. The system of claim 15, wherein the customization of the configuration further includes one of activation and deactivation of a plurality of mobile computing device functionalities.

17. The system of claim 12, wherein the mobile computing device is capable of utilizing a plurality of custom configurations based on the detected identity.

18. A key-based input device for connection to a computing device, comprising:
 a memory;
 a keyboard module having keys for textual input; and
 a connection module for providing the textual input to the computing device;
 wherein the connection module is configured to provide an identity of the key-based input device to the computing device such that the computing device is able to:
  detect the identity of the key-based input device, the identity of the key-based input device being detected via keying or index pins on the key-based input device;
  automatically determine customization parameters based on the detected identity, one of the customization parameters specifying a user interface language another customization parameter specifying a communication customization, the communication customization providing a communication capability for the computing device over a service provider network, and another customization parameter specifying a currency, the customization parameter specifying the user interface language including the capability of supporting a customization for a Braille mapping of a user input to the key-based input device, a customization for a Mandarin dialect and a customization for an assignment of one or more statistical analysis functions to one more keys of the key-based input device;
  automatically customize a configuration of the computing device based on the determined customization parameters, the computing device being customized for the user interface language, the communication capability and the currency automatically upon the detection of the identity of the key-based input device;
  provide the computing device functionality based on the custom configuration
 a communication module capable of providing the key-based input device identity to the computing device through at least one from a set of: short range wireless communication, wired communication, optical communication, and communication with a Radio Frequency Identification (RFID) tag on the connected keyboard; and
 automatically adjust two or more of the customization parameters of the computing device based on location information, one of the customization parameters being adjusted by the location information being the user interface language and another of the customization parameters being adjusted by the location information being the currency; and
 the key-based input device includes a removable key description accessory that includes one from a set of: a skin, a cover, a cover plate, a slip-on cover, a clip-on cover, a template, and an indexing template, the removable key description accessory being capable of providing the key-based input device identity to the computing device through passive communication.

19. The method of claim 1, further comprising the computing device including a plurality of communication customizations, one of the communication customizations being associated with the connected input device, the communication capability associated with the connected input device being activated upon the computing device detecting the connected input device.

20. The method of claim 1, further comprising automatically adjusting one or more of the customization parameters of the computing device based on global positioning information, one of the customization parameters being adjusted by the global positioning information being the user interface language.

* * * * *